United States Patent [19]

Lehoczky

[11] Patent Number: 4,715,211
[45] Date of Patent: Dec. 29, 1987

[54] SINGLE PULSE PEAK CIRCUIT FOR TORQUE VERIFICATION

[75] Inventor: Ken Lehoczky, Livonia, Mich.

[73] Assignee: GSE, Inc., Farmington Hills, Mich.

[21] Appl. No.: 874,533

[22] Filed: Jun. 16, 1986

[51] Int. Cl.$^4$ .............................................. G01L 25/00
[52] U.S. Cl. ................................... 73/1 C; 73/862.23
[58] Field of Search ............... 73/1 C, 862.08, 862.23, 73/862.53, 761, 770

[56] References Cited

U.S. PATENT DOCUMENTS

| | | | |
|---|---|---|---|
| 3,680,365 | 8/1972 | Summers | 73/770 |
| 4,445,093 | 4/1984 | Kohler | 324/103 P X |
| 4,517,821 | 5/1985 | Taggart et al. | 73/1 C |
| 4,562,722 | 1/1986 | Schuele et al. | 73/1 C X |
| 4,643,030 | 2/1987 | Becker et al. | 73/770 X |

Primary Examiner—Charles A. Ruehl
Attorney, Agent, or Firm—Krass & Young

[57] ABSTRACT

A method and apparatus for measuring the torque generated by a slip-type fastening device (e.g. an air driven wrench) that generates multiple torque spikes. The method measures the torque by monitoring the torque output of the device as the torque increases. When the torque reaches a peak and drops, the measured torque value is displayed. No further torque outputs of the device are then displayed. The apparatus includes a first section which receives the torque output of the device and converts it into a torque signal. A second section displays the highest torque value received. The improvement is a third section which connects and disconnects the first and second sections based on the torque output of the device. When the torque output first increases, the first two sections are connected so that torque signals are passed from one to another. After a drop in the torque output, the two sections are disconnected and the highest torque value is displayed.

5 Claims, 7 Drawing Figures

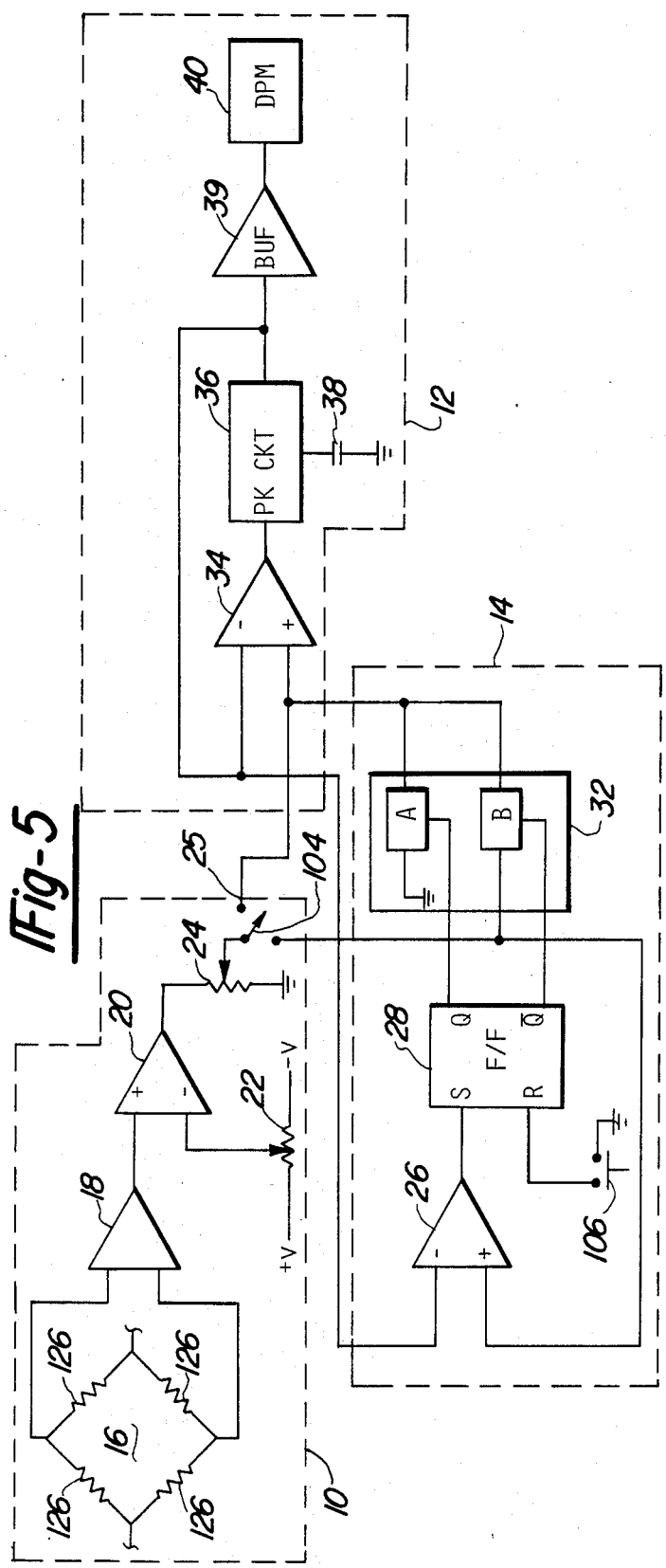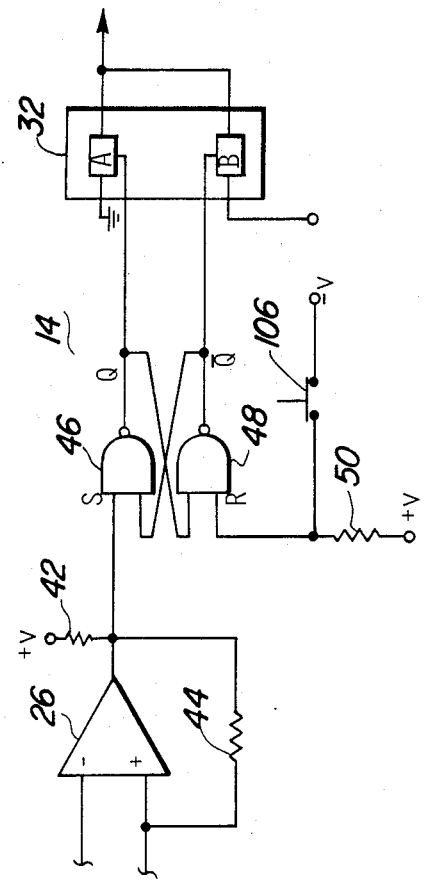

SINGLE PULSE PEAK CIRCUIT FOR TORQUE VERIFICATION

DESCRIPTION

1. Technical Field

This invention relates to methods of and devices for checking the torque applied by a torquing device to a fastener, and more specifically, to a method of and device for accurately measuring the torque output of ratcheting or other slip-type multiple spike generating torquing devices as torque output is related to transfer of energy from the tool to the fastener.

2. Background of the Invention

For many years, air driven wrenches and screwdrivers have been used to tighten nuts and screws in assembled parts. These air driven fastening devices are designed so that, at the conclusion of the tightening process, the device will ratchet.

Because of the ratcheting nature of the air driven fastening devices, it is very difficult to correlate the actual torque output of the tool with the actual torque applied to a fastener by the devices. To a greater extent this problem exists when one attempts to correlate impact tool torque peaks with actual torque/energy transferred to a fastener. The difference between a ratcheting tool and an impact tool is found in the relative energy content of the torque spikes produced during the impulse operating mode of the tool. The preferred characteristic of a ratcheting tool is that the torque spikes do not have sufficient energy content to significantly change the tightness of the fastener once the ratcheting action has started. Typically, the torque generated by the fastening device has been measured in one of two ways. First, the torque may be measured indirectly using a standard torque wrench. After a fastener is tightened by the fastening device, the fastener is turned by the torque wrench until it just moves. The torque wrench records the torque value at the point where the nut or screw moved, called the breakaway value. The breakaway value is then taken as a measure of the level of torque applied by the fastening device.

The hand torque, breakaway method of estimating the torque applied to a fastener is a secondary measurement, subject to a large number of inaccuracies. First, there is the human error involved in retorquing the fastener. Retorquing beyond the breakaway point can result in an erroneous reading. In addition, the breakaway point of the fastener can vary depending on a number of conditions. For example, if the fastener has rusted, the breakaway value will be larger than it should be. Similarly, the breakaway value is affected by other frictional characteristics of the fastener such as galling of the threads and the natural differences between static and sliding coefficients.

An alternative means of measuring the torque generated by the fastening device is to directly measure the torque output of the device during the rundown process. This is done by connecting the output shaft of the fastening device to a torque sensor which sends a signal to a peak meter to record the highest torque generated by the fastening device. Peak meters, however, have great difficulty in accurately measuring the torque output of a ratcheting fastening device because torque spikes are created each time the device ratchets. The instantaneous torque output of the fastening device in the ratcheting mode can be large, however, due to the short duration of the pulses during ratcheting, the actual energy transferred to the fastener produces little or no increase in clamping action (tightness) once ratcheting has begun. As a result, a peak meter, which records only the instantaneous torque output, often records too high a torque value which cannot be correlated directly to the tightness produced in the fastener/joint configuration.

The problems of measuring the torque output of ratcheting fastening devices vary with respect to all slip-type fastening devices that generate one or more torque spikes after reaching the desired torque value. It is critical not to just look at the first torque spike but also to determine if it is too fast, such that there is not enough energy transferred to move the fastener. The torque is a secondary estimate of tightness of the fastener which can only be accurately correlated to tightness if the energy transfer element of the tightening process is properly accounted for by the measuring system. The invention can be used to measure torque outputs of all slip-type fastening devices, including those that generate multiple torque spikes.

SUMMARY OF THE INVENTION

The present invention overcomes the difficulties encountered with prior art methods of verifying torque output by recording only the first torque peak generated by the fastening device. The apparatus is used by connecting it directly to the fastening device in the same manner as a prior art peak meter. The novel method measures the actual torque generated by the fastening device by first monitoring the torque output of the device and continuously storing the maximum torque value generated. When the torque output of the device drops, the highest torque output is displayed and storage of incoming torque values is discontinued.

The torque measuring apparatus includes means for monitoring the torque output of the fastening device and means for continuously storing the highest torque value generated by the device. A latching means operates to display the highest torque value received when the torque output of the fastening device drops. The latching means also stops the storage of incoming torque values.

BRIEF DESCRIPTION OF THE DRAWINGS

FIG. 5 is a partially block, partially schematic diagram of the torque measuring device of the present invention;

FIG. 6 is a detailed schematic diagram of the latching apparatus of the torque measuring device.

DETAILED DESCRIPTION OF THE INVENTION

Figure 1:
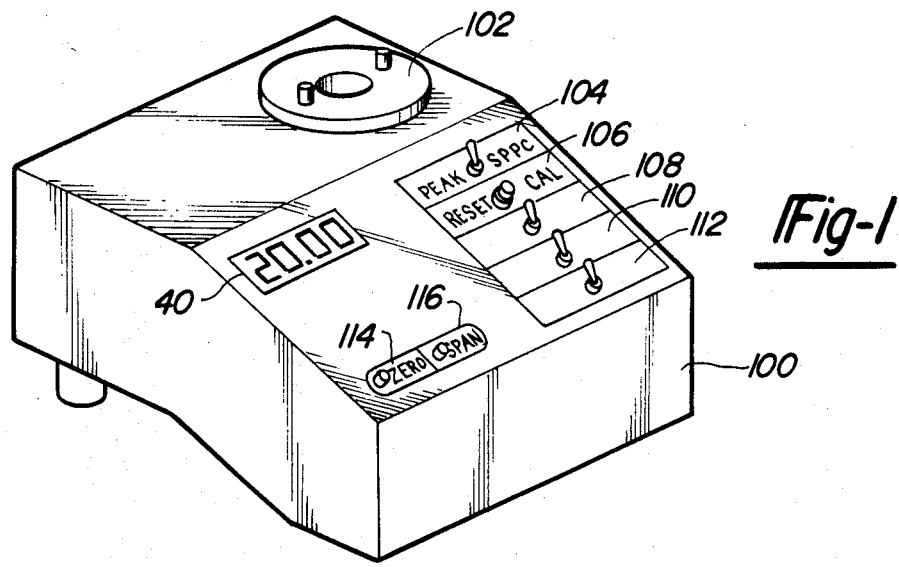
FIG. 1 is a perspective view of the enclosure and control switches for the present invention.

FIG. 1 is an example of an enclosure that may be used in conjunction with the present invention. The enclosure includes a main casing 100, a torque transducer 102, a plurality of switches 104, 106, 108, 110, 112, 114, and 116, as well as a digital display 40. Switches 104, 106, 114 and 116 are used with the present invention as will be described more fully, below. The remaining switches 108–112 are not necessary for proper operation of the invention, but might be used, for example, to control such things as the range of values displayed, the units (NM or Lb-in) measured, on/off condition, and so forth.

Figure 2:
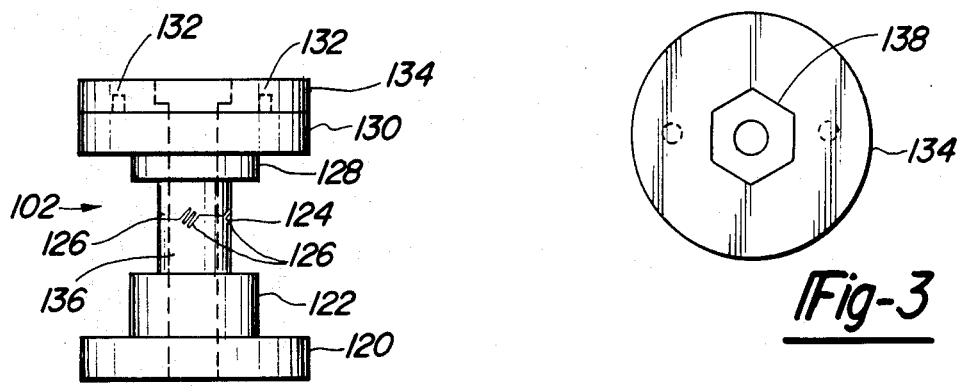
FIG. 2 is a side view of the torque transducer used with the present invention, including an adapter washer.

The torque transducer 102 is preferably of the strain gage type. As shown in FIG. 2, the transducer comprises a base 120 which is designed to be securely mounted in the enclosure 100, for example with threaded fasteners (not shown). Above the base 120 is a collar 122 and a neck 124. A plurality of strain gauges 126 are mounted on the neck 124 and electrically connected together in a Wheatstone bridge configuration well-known in the art. Above the neck 124 is a shoulder 128 and a head 130. The head 130 includes a pair of posts 132. The posts hold an adapter washer 134 in place on the top of the transducer.

Figure 3:
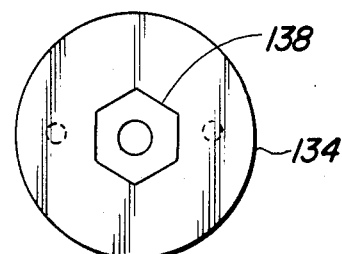
FIG. 3 is a top view of the adapter washer used on the torque transducer.
Figure 4:
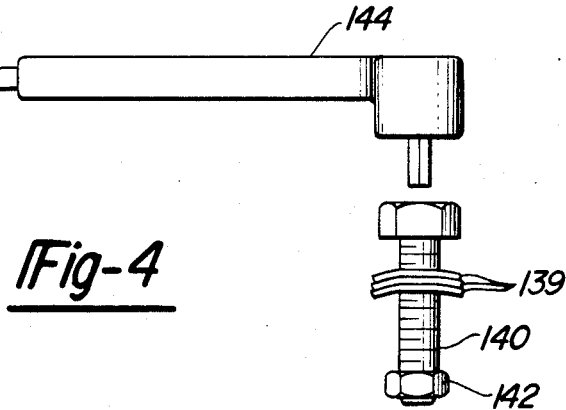
FIG. 4 is a side view of a fastening device and fastener used with the torque transducer and adapter washer.

The transducer is preferably machined from a single piece of metal. Thus, the entire transducer assembly is rigidly held in the enclosure 100. The transducer includes a central axial bore 136 for receiving a fastener, such as that shown in FIG. 4, during operation of the invention. The bore 136 is wide enough so that the fastener does not contact the sides of it. The adapter 134, as best seen in FIG. 3, has a hexagonal cutout 138 in its center for receiving a nut.

In use, a plurality of Belleville washers 139 (see FIG. 4) are placed on a fastener 140 between the top of the fastener and a nut 142. The fastener 140 and nut 142 are then placed into the adapter 134 with the nut at the bottom. The adapter is designed to hold the nut 142 securely while the fastener 140 is free to turn. Different adapters may be used with different types of fasteners and different nuts.

A fastening device, such as air driven wrench 144, is attached to fastener 140 and activated to tighten the fastener. As the fastener tightens, the washers 139 are compressed. The washers 139 control the softness or hardness of the joint depending on their number and type. The torque applied to the transducer will be picked up by the torque measuring circuit of the present invention, as described below. Eventually, the fastener is tightened to a point where the wrench begins to ratchet. The torque generated by the wrench is then displayed on the read-out 40.

FIG. 5 illustrates the electrical apparatus of the present invention. The apparatus comprises three primary sections. The first section 10 is a means for monitoring the torque output of a fastening device and converting the output into an electrical signal proportional to the torque. The second section 12 is a means for storing the maximum torque output of the fastening device and for displaying the maximum value. The third section 14 is a means for detecting a drop in the torque output of the fastening device and for disabling the second section 12 from storing further torque values.

The first two sections 10 and 12 are typical of those found in virtually all prior art peak meters. For example, such a peak meter is sold by GSE Inc. of Farmington Hills, Mich. Model No. 229D. In prior art devices, the first and second sections 10 and 12 are connected directly together. The prior art peak meters detect and display the maximum torque output of a fastening device. As can be seen from FIG. 7, however, such a measurement is likely to result in erroneous readings when used with a ratcheting torque wrench.

Figure 7:
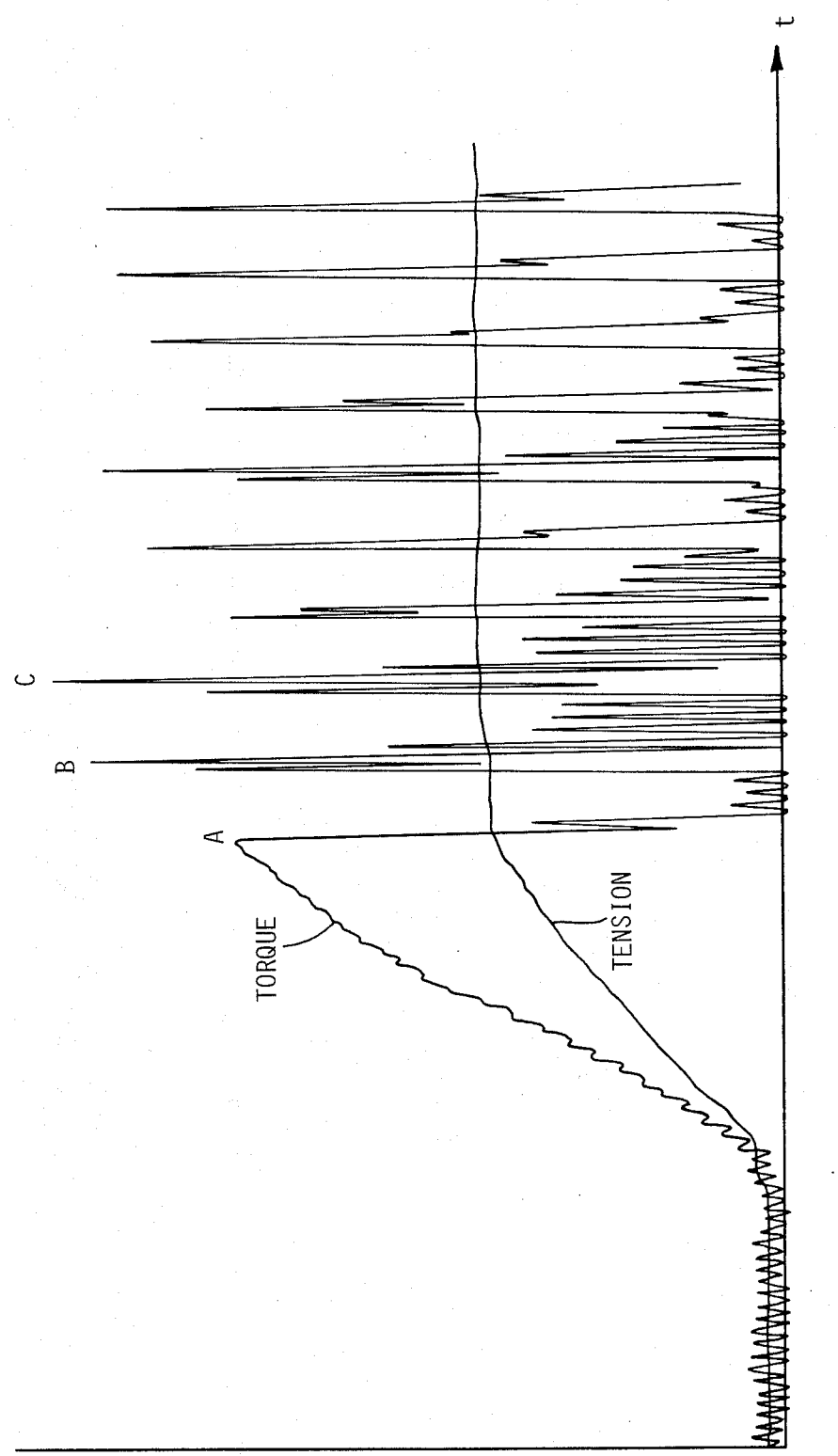
FIG. 7 is graph illustrating the relationship between torque and tension that results when a slip-type multiple spike fastening device is used to tighten a fastener.

FIG. 7 illustrates the relationship between torque and tension as a fastener is tightened with a ratcheting torque wrench. The curve labeled TORQUE illustrates the instantaneous torque output of the torque wrench at any given point in time. The curve labeled TENSION illustrates the resulting tension on a fastener as measured at the fastener. Through experimentation, I have discovered that the tension on a fastener is determined almost exclusively by the torque generated by the first torque peak (at A in FIG. 7). Subsequent torque spikes, for example at B and C, caused by ratcheting of the wrench, have no significant effect on the tension on the fastener. Therefore, to accurately measure the actual torque applied to a fastener, one need only measure the value of the first torque peak. All subsequent torque peaks can and should be ignored.

A prior art peak meter measures not only the first torque peak at point A, but also peaks B and C. Since peak C is the highest torque value, the peak meter would display its value as the actual torque generated by the wrench. However, it is clear from FIG. 7 that torque spikes B and C added virtually no tension to the fastener. Furthermore, the torque generated by the wrench varies signififantly from ratchet to ratchet, as is evident from FIG. 7. Thus, the spikes are not an accurate measure of the actual torque applied at the fastener.

Referring back to FIG. 5, the first section 10 of the apparatus includes a wheatstones bridge 16 comprising strain pages 126. The torque applied by a torque wrench 144 is transformed into an electrical signal using the bridge 16 in a manner well-known in the art. The output of the Wheatstone bridge 16 is connected to a preamplifying stage 18 which amplifies the signal out of the strain gages. The preamplified signal is passed to a zero adjustment operational amplifier 20 which is used to set the display at zero when no torque is applied to the strain gages 126. The zero point is set using potentiometer 22, the wiper arm of which is an input to operational applifier 20. The potentiometer is controlled by the operator using adjustment knob 114 (FIG. 1).

The output of operational amplifier 20 is sent to a calibration potentiometer 24. This potentiometer is adjusted so that the display indicates the proper torque when a known torque is applied to the apparatus. In this manner, the apparatus can be calibrated. The calibration potentiometer 24 is controlled by the operator using adjustment knob 116 (FIG. 1).

In prior art peak meters, the wiper arm of the potentiometer 24 was connected directly to the input to the second section 12 of the apparatus via lead 25. The present invention, however, may be operated either as a prior art peak meter or as a single pulse peak meter. Switch 104 connects the output of potentiometer 24 to either section 12 or the third section 14. The third section comprises comparator 26 which receives inputs from potentiometer 24 and from the second section 12 as will be described below. The output of comparator 26 is delivered to the "set"0 input of flip-flop 28. The "reset" input of the flip-flop is connected to a reset switch 106 actuable by the operator of the aparatus (see FIG. 1).

The output of flip-flop 28 is delivered to analog switch 32 to control communication between the first section 10 and this second section 12. The Q output of flip-flop 28 is connected to a first switch A of analog switch 32. The $\overline{Q}$ output of flip-flop 28 is connected to a second switch B of the analong switch 32.

The output of analog switch 32 forms an input to the second section 12. Second section 12 comprises operational amplitier 34 and peak circuit 36. Operational amplifier 34 receives input from the third section 14 and dfeedback from the peak circuit 36. The peak circuit 36 includes a capacitor 38 which charges as the voltage output of operational amplifier 34 rises.

The capacitor 38 holds the peak value of the torque and is delivered to a buffer 39 for display on the digital peak meter 40.

In operation, the torque generated by the torque wrench 144 and transmitted through the fastener 139 to nut 142 is transformed into a torque signal by the strain gages 126. The torque signal is amplified by operational amplifier 18 and fed to the zero adjustment amplifier 20. The signal coming out of amplifier 20 is properly zeroed according to the setting of potentiometer 22.

The torque signal then passes through potentiometer 24 which has been previously adjusted to provide an accurate reading when a known torque is applied to the apparatus. The torque signal, after passing through potentiometer 24, is therefore an accurate indication of the actual torque.

To best understand the operation of the present invention it is important to understand the operation of the prior art apparatus. For this reason, assume for the moment that switch 104 (FIG. 1) is in the "peak" position. In this position, section 10 is connected to section 12 via lead 25.

The scaled torque signal from potentiometer 24 is delivered to the non-inverting input of operational amplifier 34. At the inverting input of the amplifier 34, the amplifier receives feedback from the peak circuit 36. Assuming that the torque signal is rising, indicating that the torque wrench 144 is applying greater and greater torque, the voltage at the non-inverting input of amplifier 34 will be increasing. The voltage at the inverting input of the amplifier will also be increasing at essentially the same rate as the torque signal voltage because of the feedback from peak circuit 36. The output of amplifier 34 is directly proportional to the torque signal appearing at the non-inverting input.

The amplifier's output is delivered to peak circuit 36 and stored on capacitor 38.

When the torque signal drops, such as when the wrench ratchets, the voltage at the non-inverting input of amplifier 34 drops quickly. The voltage at the inverting input, however, remains the same because of the feedback voltage stored on capacitor 38. The output of the amplifier 34 therefore becomes negative. The negative voltage deactivates the peak circuit 36 and the voltage stored on capacitor 30 is displayed on the digital peak meter 40 through buffer 39. It should be noted that, although the torque generated by the fastening device includes a series of slight drops in output prior to reaching the first peak A (FIG. 7), they occur at a relatively high frequency and are not sensed by the apparatus.

Assuming that the torque wrench continues to ratchet, the torque signal at the non-inverting input of amplifier 34 drops from peak A to near zero and then begins to rise again as illustrated in FIG. 7. The torque signal at the non-inverting input eventually rises above the voltage of the feedback signal at the inverting input because, as illustrated in FIG. 7, the torque signal at peak B is higher than the torque signal at peak A. Thus, the output of the amplifier 34 again goes positive, reactivating the peak circuit 36. The voltage at the inverting input of the amplifier again matches and begins to follow the voltage at the non-inverting input. This further charges capacitor 38. After the torque peak B is reached, the voltage at the non-inverting input drops and the output of the amplifier 34 again goes negative. The peak circuit 36 is deactivated and the voltage on capacitor 38 passes on to buffer 39 and to the digital peak meter 40 which displays the new peak level.

The process continues each time the torque signal at the non-inverting input of the amplifier 34 is higher than the previous torque peak. Consequently, when a prior art peak meter is used with a ratcheting fastening device, the highest instantaneous torque value is displayed on the meter regardless whether it has any significant effect on the tension at the fastener.

The third section 14 is used to prevent all but the first torque peak from reaching the second section 12. When the section 14 is added, it is connected between the output of potentiometer 24 and the non-inverting input of amplifier 34. Comparator 26 receives, at its non-inverting input, the torque signal from section 10. At the inverting input of comparator 26, the comparator receives the same feedback signal that is applied to the inverting input of amplifier 34.

To measure the torque, the operator presses reset swich 106 to reset flip-flop 28 to an initial state. In its initial state, the $\overline{Q}$ output of flip-flop 28 closes switch B in analog switch 32 connecting the output of potentiometer 24 to the non-inverting input of amplifier 34. The Q output of flip-flop 28 opens switch A of analog switch 32 so that no connection is made between ground and the non-inverting input of amplifier 34.

With switch B closed, the first and second section 10 and 12 of the apparatus, operate precisely as described above for the prior art device. In addition, however, feedback to the inverting input of amplifier 34 is also delivered to the inverting input of comparator 26. Thus, the inputs to comparator 26 are precisely the same as those at the inputs to amplifier 34. The torque signal appears at the non-inverting input of comparator 26 and the feedback signal at the inverting input. Consequently, the output of comparator 26 is a zero signal which maintains flip-flop 28 in its initial state. Thus, the torque signal from section 10 is delivered to section 12 through switch B.

When the torque signal drops, i.e. when the wrench ratchets, the voltage at the non-inverting input of comparator 26 falls, but the voltage at the inverting input remains the same because of the feedback voltage stored on capacitor 38. Thus, the voltage at the inverting input of comparator 26 will remain high and the output becomes negative. The S input to flip-flop 28 is therefore a logical zero which sets the flip-flop. This causes the Q output of the flip-flop to be set to one and the $\overline{Q}$ output to be set to zero. As a result, switch B of analog switch 32 is opened disconnecting section 10 from section 12 and switch A is closed connecting the non-inverting input of amplifier 34 to ground. Since the non-inverting input of amplifier 34 is now connected to ground, no further torque signals can reach the amplifier. Therefore, the first peak signal is displayed and no further signals are supplied to section 12.

The comparator 26 continues to receive torque signals, but they have no effect on the remainder of the circuit. Even when the torque signal at the non-inverting input of the comparator rises again, and the output of the comparator goes to zero, the flip-flop remains set. Thus, the remainder of the circuitry is effectively disabled and the first torque peak value is displayed.

FIG. 6 is a schematic of the third section 14 of the present invention. Comparator 26, preferably an LP311H operational amplifier, receives input from the first section 10 and the second section 12. A pull-up resistor 42 is used to bias the signal at the output of comparator 26 to a positive voltage. The comparator 26 also includes feedback resistor 44. Flip-flop 28 is preferably a pair of NAND gates 46 and 48 connected in a standard flip-flop configuration. The output of comparator 26 is one input to NAND gate 46. The other input is connected to the output of NAND gate 48. NAND gate 48 receives inputs from the output of NAND gate 46 and from a reset switch 106. The latter input to NAND gate 48 is normally biased high through resistor 50.

Assuming that no torque is being applied to the apparatus and that the reset button is pressed, the flip-flop is reset. Pressing the switch 106 presents a zero signal at the R input of NAND gate 48. The zero signal forces the output of NAND gate 48 to logical one which is then applied to the input of NAND 46.

When no torque is applied to the apparatus, there are no signals at the inputs of comparator 26. The output of the comparator, therefore, is zero. However, the S input to NAND gate 46 is a 1 signal because of the voltage applied through resistor 42. Since both inputs to NAND gate 46 are 1, the output of the NAND gate is zero. This presents a second zero input to NAND gate 48.

Upon releasing switch 106, a 1 signal is applied to the R input to NAND gate 48 through resistor 50. However, because the other input to NAND gate 48 is a zero signal, the output of the gate remains at 1. The outputs of the NAND gates 46 and 48 control switches A and B of analog switch 32. The analog switch is preferably a 4016 integrated circuit. As noted earlier, switch A is initially open because a zero signal is applied from NAND gate 46. Switch B is normally closed because a 1 signal is initially applied from NAND gate 48.

As torque is applied to the apparatus, the signals at the two inputs to comparator 26 are the same. Consequently, the input to NAND gate 46 from the comparator remains at a logical 1 signal level maintaining the flip-flop in its initial state.

When the torque signal falls, the voltage at the non-inverting input of the comparator drops below the feedback signal at the inverting input. A negative voltage thus appears at the output of the comparator. The negative output of the comparator is enough to overcome the positive bias presented by resistor 42. As a result, a zero signal is applied to the 8 input of NAND gate 46. This immediately causes the output of NAND gate 46 to become a 1. The 1 signal is applied as an input to NAND gate 48. This signal, together with the 1 signal at the R input to NAND gate 48 causes the output of NAND gate 48 to become zero. The outputs of the NAND gates are applied to analog switch 32. As a result, switch A is closed and switch B is opened. From this point on, until the reset button is pressed, the outputs of NAND gates 46 and 48 will remain at logical levels 1 and zero, respectively and switches A and B will remain closed and open, respectively.

Throughout this discussion, it has been assumed that the torque generating device is a ratcheting torque wrench. However, the present invention operates properly with any slip-type fastening device, including those which generate multiple torque peaks during use. Furthermore, the invention is not limited to the described preferred embodiment. The key to practical application of the concepts defined herein is to verify by actual measurement that enough energy was imparted to the fastener to produce a desired clamping force. For example, a torque measurement would verify what energy was imparted to the fastener. Such measurements are a practical method to verify the energy transfer characteristic of a particular tool as related to a specific fastener/joint configuration.

I claim:

1. A method of measuring the torque generated by a fastening device which produces multiple torque spikes comprising the steps of:
   a. monitoring the torque output of the fastening device as the torque increases and converting the torque output into a torque signal;
   b. displaying the value of the highest torque signal received; and
   c. when the torque output of the fastening device drops, preventing display of all subsequent increases in torque output of the fastening device.

2. The method of claim 1 including the step of storing said torque signal as it is received prior to a drop in the torque output level of the fastening device.

3. An apparatus for measuring the torque generated by a fastening device which produces multiple torque spikes, the apparatus including first means for receiving the torque output of the fastening device as the torque increases and converting the torque output into a torque signal and second means for displaying the value of the highest torque signal received, the improvement comprising:
   third means, electrically connected between the first and second means for monitoring the torque signal, for connecting the first means to the second means while the torque signal increases and for disconnecting the first means from the second means when the torque signal first drops, whereby said second means only displays the value of the torque signal corresponding to the first of said multiple torque spikes.

4. The apparatus of claim 3 wherein the third means includes:
   monitoring means for determining when the torque output of the fastening device has dropped;
   switching means for connecting and disconnecting the first means to and from the second means; and
   latching means, responsive to the monitoring means, for controlling the operation of the switching means and for maintaining the switching means in its disconnected state when the torque output of the fastening device has dropped.

5. The apparatus of claim 4 wherein the latching means includes an operator controlled reset switch actuable to cause the latching means to control the switching means to connect the first means to the second means.

* * * * *